United States Patent [19]
Whiteside

[11] Patent Number: 4,630,912
[45] Date of Patent: Dec. 23, 1986

[54] WET PROCESSING WEB CAMERA AND METHOD

[75] Inventor: George D. Whiteside, Lexington, Mass.

[73] Assignee: Polaroid Corporation, Cambridge, Mass.

[21] Appl. No.: 747,899

[22] Filed: Jun. 24, 1985

[51] Int. Cl.⁴ .............................................. G03B 17/50
[52] U.S. Cl. ..................................... 354/88; 354/275; 354/318
[58] Field of Search ................. 354/88, 303, 304, 305, 354/318, 275, 84, 85, 86, 87

[56] References Cited

U.S. PATENT DOCUMENTS

| | | | |
|---|---|---|---|
| 3,229,605 | 1/1966 | Eloranta | 354/86 |
| 3,238,858 | 3/1966 | Eloranta | 354/84 |
| 3,314,791 | 4/1967 | Cotta et al. | 354/88 |
| 3,314,792 | 4/1967 | Land | 354/86 |
| 3,907,563 | 9/1975 | Land | 96/3 |
| 4,523,825 | 6/1985 | Norris | 354/318 |

Primary Examiner—A. A. Mathews
Attorney, Agent, or Firm—David R. Thornton

[57] ABSTRACT

A method and apparatus for handling photographic film systems in which a liquid processing agent is carried by one of two film components which, after exposure, are processed by bringing the two components into face-to-face contact. The apparatus features a cassette structure having a central tray-like section with cylindrical housings at opposite ends. The housing for the processing agent carrying web is provided with a releasable stopper by which that web may be passed from the chamber without obstruction and the chamber resealed to inhibit evaporation and carbonation of the web-carried processing agent.

14 Claims, 12 Drawing Figures

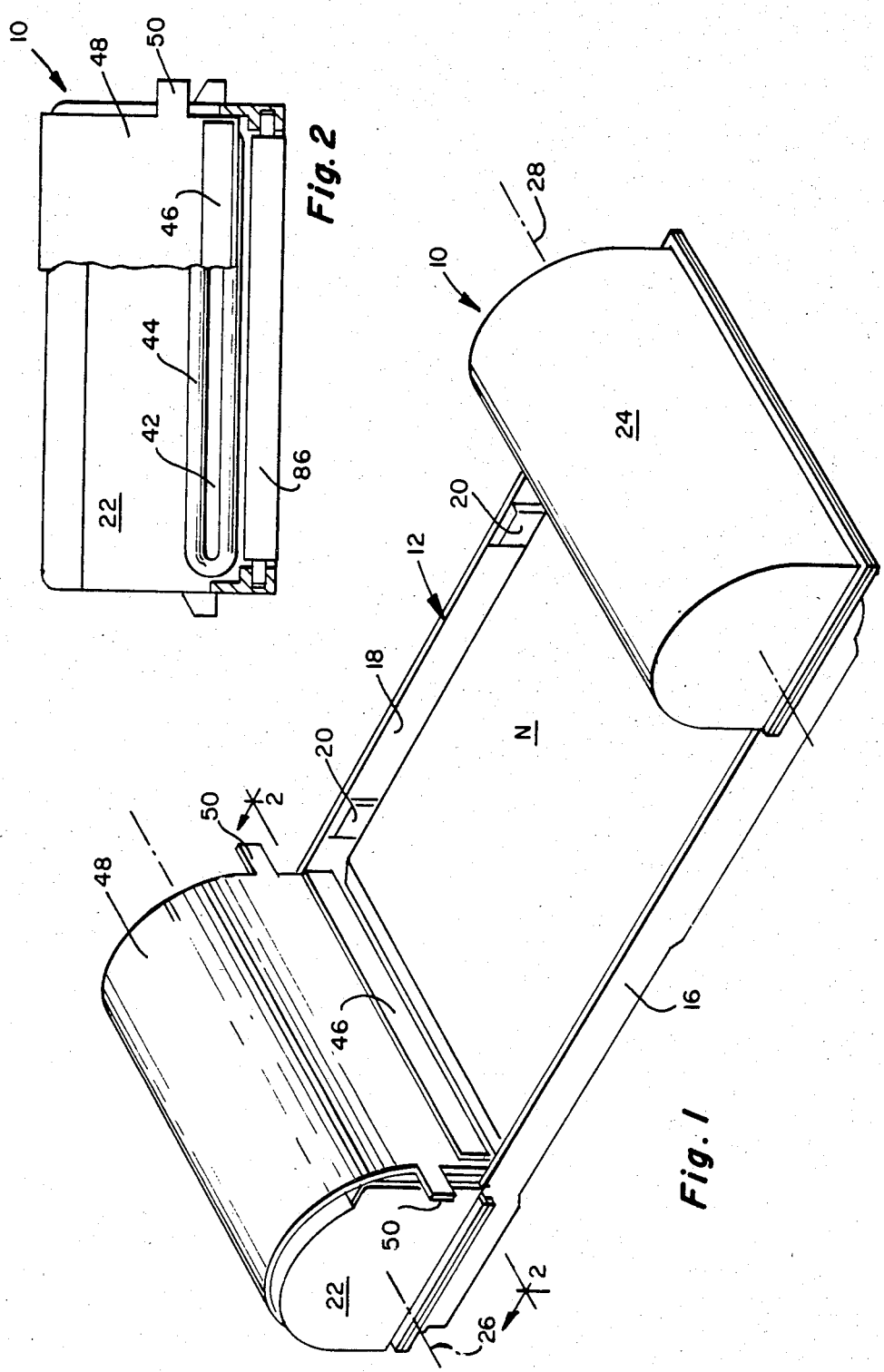

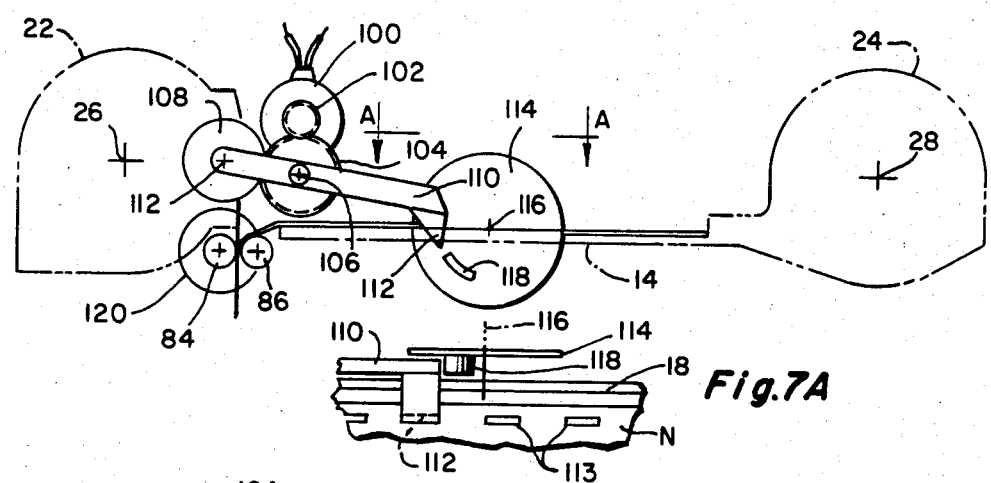
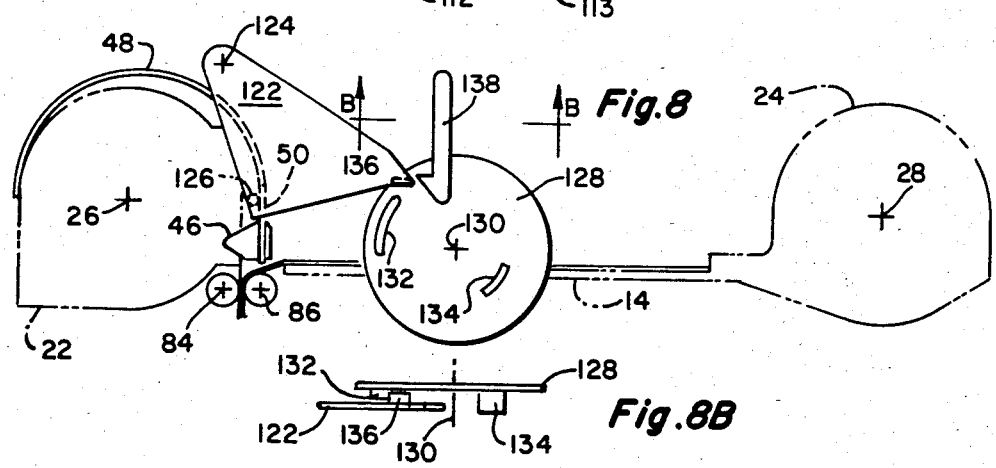
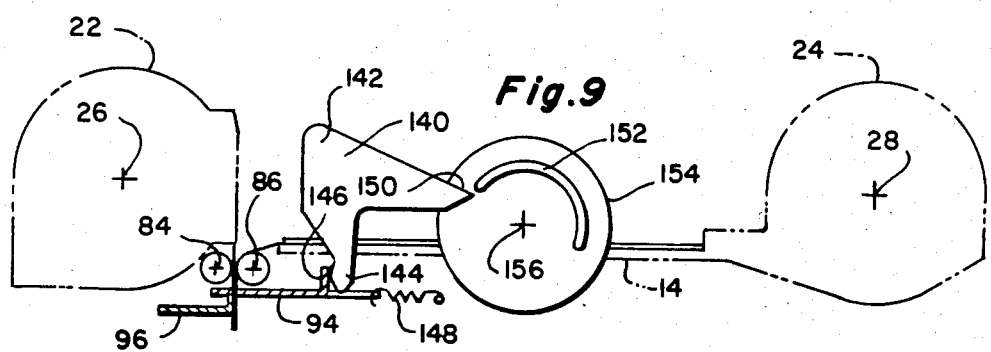

WET PROCESSING WEB CAMERA AND METHOD

BACKGROUND OF THE INVENTION

This invention relates to photographic systems. More particularly, it concerns a method and apparatus for storing, exposing and processing photographic film from which a positive print or transparency is formed by exposing an initially separate negative sheet and bringing the negative into face-to-face contact with a positive image receiving sheet previously coated or impregnated with a processing agent capable of effecting image transfer from the exposed negative to the positive receiver.

Commonly assigned U.S. Pat. No. 3,907,563 issued to Edwin H. Land on Sept. 23, 1975 discloses a diffusion transfer process in which the image receiving element or sheet is impregnated with an alkaline processing composition. The image receiver or positive sheet includes a transparent support through which the final image may be observed in an image receiving coating or layer directly on the transparent support. Reflectivity for use of the system as a positive print is provided by a white pigmented layer backed by an opaque layer. The three layers thus provided on the transparent support are impregnated with a liquid alkaline processing agent common to diffusion transfer film processing.

The negative element of the system disclosed in the aforementioned patent includes a support of mylar or similar material which may be either transparent or opaque. The negative support is coated by polymetric acid layer, a timing layer, a dye developer layer and finally a silver halide layer. After exposure of the silver halide layer on the negative, the two sheets are brought together in intimate face-to-face contact as a laminate with the several coatings situated between the respective negative and positive sheet supports. The processing agent functions to transfer the latent image formed by exposure of the silver halide layer of the negative to the image-receiving layer directly behind the transparent support of the receiver sheet. The acid layer in the original negative sheet functions to neutralize the alkaline processing fluid but under the control of the timing interlayer situated between the acid layer and the remaining layers of the composite laminate.

The diffusion transfer system disclosed in U.S. Pat. No. 3,907,563 is especially attractive from the standpoint of attaining high quality photographs with virtually no provision for assuring uniformity of processing fluid spread between the respective negative and positive elements other than impregnation of the positive element during manufacture. In this respect, it is to be noted that in substantially all commercially available diffusion transfer film systems, the alkaline processing fluid is initially contained by a rupturable pod, carried as a component of the film assembly, to be spread between the negative and positive elements of the film assembly after negative exposure. The uniformity of this spread requires precision not only in the processing apparatus which is incorporated as a part of a camera or equivalent, but also a sophisticated and expensive combination of elements in the film sheet assembly, itself.

While a film system of the type disclosed in U.S. Pat. No. 3,907,563 has potential for significant reduction in costs over current diffusion transfer systems particularly in the manufacture of film, use of such film on a commercial basis is not without problems. Because of the strongly alkaline character of the processing agent and the need for its neutralization after processing, the components carrying the processing agent and the neutralizing acid layer must be kept separate until the processing step is performed. Also, it is important that the liquid processing agent in the positive sheet element be kept from evaporation and that the pH level of the liquid be maintained. Moreover, these conditions must be maintained not only for the normal shelf life of commercial photographic film but also after the film is loaded into a camera and stored in the camera. In addition, the film system requires an image reversal prior to negative exposure because the positive image observed through the transparent support on the receiving element is identical to the image received on the negative. In other words, a reflux mirror is required between the lens and the film plane of the camera in which the film is to be exposed.

Commonly assigned U.S. Pat. No. 3,314,792 issued to Edwin H. Land on Apr. 18, 1967 discloses a camera system for accommodating photographic film in which a processing liquid is impregnated in or coated on one of two sheet elements. In this instance, the negative and positive sheet elements are separately packaged and thus separately mounted in the camera in order to solve the problem of sealing the processing the liquid impregnated component of the film system to maintain the pH level of the processing liquid and also to prevent its drying out. Other prior U.S. patents which address this problem include U.S. Pat. No. 3,229,605 and No. 3,238,858 issued to V. K. Eloranta and No. 3,314,791 issued to E. D. Cotta et al. None of the disclosures in any of these patents, however, have been incorporated in a viable commercial photographic system.

In light of the foregoing, it will be appreciated that there is a need for a photographic system by which the significantly reduced manufacturing costs of processing fluid impregnated film units may be advantageously deployed.

SUMMARY OF THE PRESENT INVENTION

In accordance with the present invention, the problems heretofore encountered with film systems in which the processing agent is impregnated in or carried by one of two film components are substantially overcome by a photographic method and apparatus such as a camera, film processor or printer for photographic or electronic imaging systems featuring a cassette structure and organization by which the negative and positive elements of the film system may be separately packaged and maintained during storage and use in a camera for intermittent exposure of consecutive film frames. The positive or receiver element of the film is contained within a cassette chamber equipped with a releasable stopper by which the chamber may be essentially sealed at all times and yet opened to facilitate passage of the positive or receiving film element from the chamber during a processing operation.

The cassette structure preferably includes a central tray-like section with cylindrical film housings at opposite ends, one for receiving the negative film element and the other for receiving the impregnated or coated positive element. Both film elements are packaged as coiled sheets or webs and are advanced from their respective chambers by a single pressure roll pair used during the processing operation to bring the two film elements into face-to-face contact. In addition to the measure of sealed containment of the impregnated positive film provided by the releasable stopper, the positive film housing is arranged so that the outer periphery of the coiled positive film is urged at all times against the interior of the stopper opening to augment the sealing action and also to assure that the length of positive film extending from the opening is kept at a minimum. The positive film element housing is further provided with a source of sacrificial liquid, such as water or processing reagent, contained in an absorbant media preferably arranged near the outlet of the housing chamber.

A principal object of the present invention is, therefore, the provision of a photographic method and apparatus capable of accommodating, in a viable commercial embodiment, diffusion transfer film of the type in which a processing agent is impregnated in or coated on one of two film sheet components prior to processing. Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 1 is a perspective view illustrating a cassette structure used in the invention;

FIG. 2 is a cross-section on line 2—2 of FIG. 1;

FIG. 7 is a schematic illustration illustrating a film advance mechanism of the invention;

FIG. 7A is a fragmentary cross-section on line A—A of FIG. 7;

FIG. 8 is a schematic side elevation illustrating a stopper actuating mechanism used in the invention;

FIG. 8B is a fragmentary cross-section on line B—B of FIG. 8;

FIG. 9 is a similar schematic side elevation illustrating a cutter actuating means in accordance with the invention.

DETAILED DESCRIPTION OF THE PREFERRED EMBODIMENT

Figure 3:
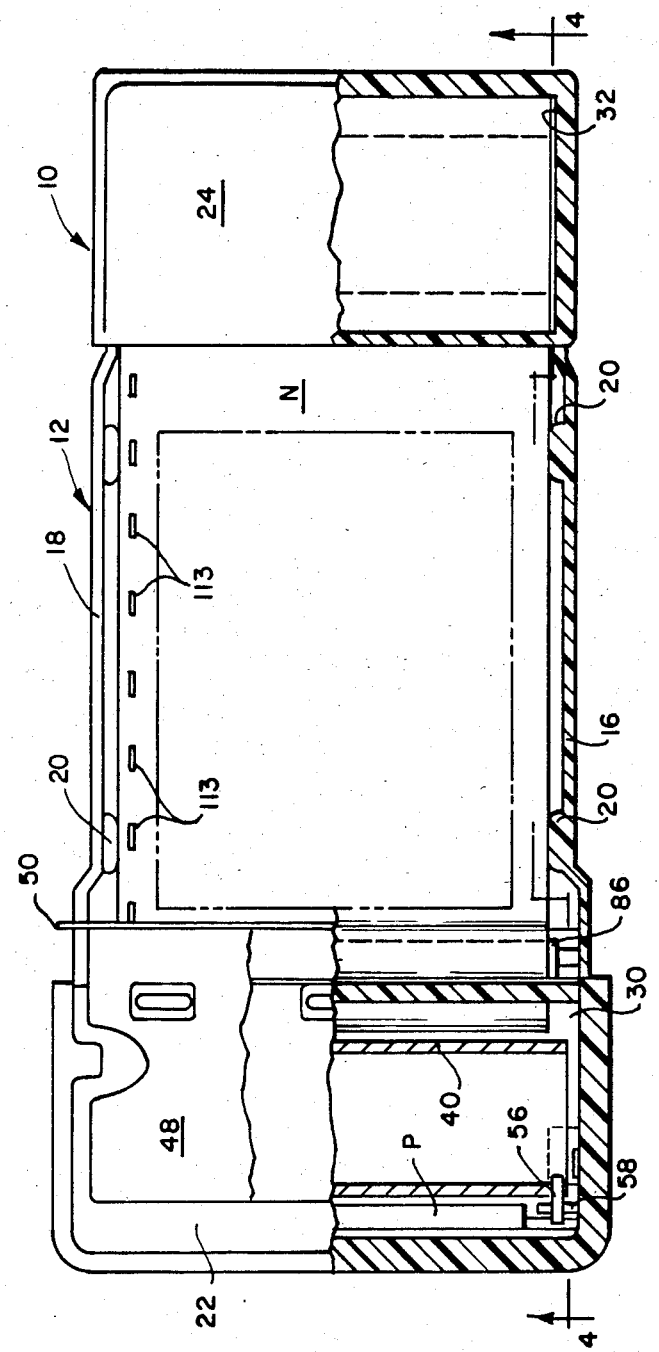
FIG. 3 is a top plan view of the cassette illustrated in FIG. 1 partly in cross-section.

A preferred embodiment of a cassette used with the present invention is illustrated in FIGS. 1-4 of the drawings and generally designated by the reference numeral 10. The exterior configuration of the overall cassette is illustrated most clearly in FIG. 1 as including a central tray-like section 12 having a generally planar floor 14 (FIG. 4) and a pair of side walls 16 and 18. The side walls 16 and 18 are of a height enabling them to extend both above and below the floor 14 and are connected under the floor 14 by transverse web formations 19 to provide strength in the overall cassette structure. Guide bosses 20 are provided on the interior of the side walls 16 and 18 to assist in guiding a negative web N longitudinally for the length of the central section 12.

Fixed at opposite ends of the central tray-like section 12 are a pair of generally cylindrically housings 22 and 24 oriented on parallel axes 26 and 28, respectively. The housings 22 and 24 respectively define interior, generally cylindrical chambers 30 and 32 for coiled web elements of a film system exemplified by the disclosure of U.S. Pat. No. 3,907,563, the disclosure of which is expressly incorporated herein by reference. In particular, a coiled web of a negative film element N is contained in the chamber 32 defined by the housing 24. Similarly, a coiled web or spool of a positive film element P is contained in the chamber 30 defined by the housing 22.

The negative film chamber 32 defined by the housing 24 is principally a light-tight enclosure and includes a slot-like opening 36 spaced slightly above the floor 14 of the central tray section 12. Although the coil of the negative element N may be supported on a spool (not shown) journalled in the housing 24, it is adequately supported as a coil resting on an arcuate floor portion 38 at the bottom of the housing 24 where movement of a flight of the web N along the floor 14 of the tray section 12 causes clockwise rotation of the coil as viewed in FIG. 4 of the drawings, for example.

The housing 22 is designed to accommodate the one of the two elements of a film system in accordance with the disclosure of U.S. Pat. No. 3,907,563 which carries a liquid processing agent either as an impregnation of web portions constituting that element or as a coating on that web element. As in the aforementioned patent, the web element P contained in the chamber 30 is the positive image receiving element of the film system. In this regard, the chamber 30 is made of suitable material and wall thickness relatively impermeable to air and moisture. The web element P is illustrated as coiled on a hollow core 40 having a length exceeding that of the web width so that the core extends axially at opposite ends of the web convolutions.

Figure 4:
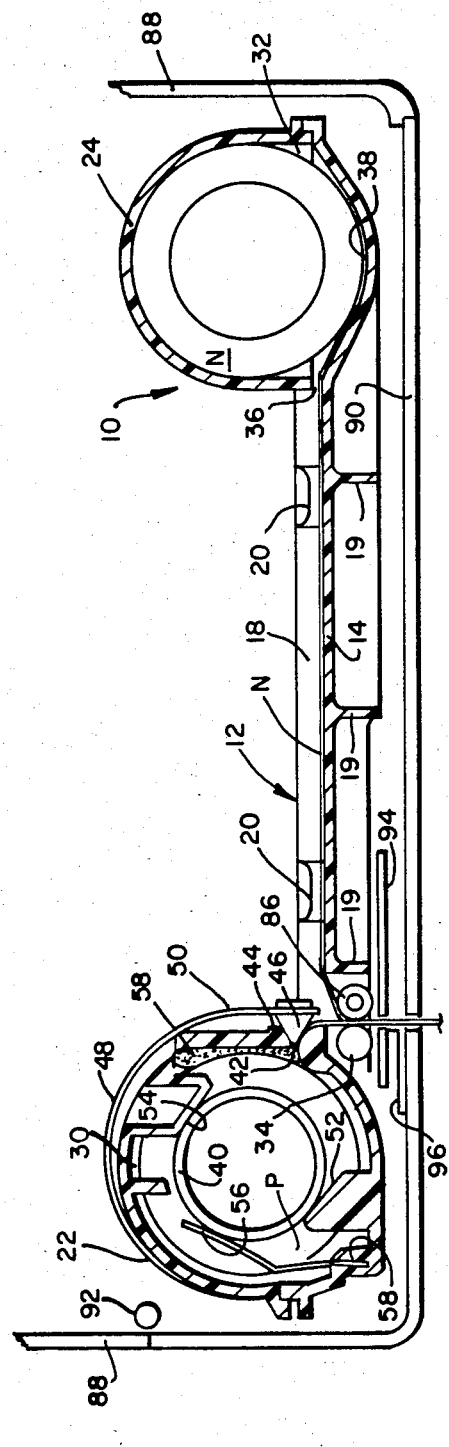
FIG. 4 is a cross-section on line 4—4 of FIG. 3.

As shown most clearly in FIGS. 2 and 4 of the drawings, the housing 22 also includes a slot opening 42 by which the positive web element P may be passed from the chamber 32 in the direction of the central tray section 12. The opening is positioned slightly above the level of the floor 14 and is defined on the exterior of the housing 22 as a smoothly curved, outwardly flared and continuous lip 44 circumscribing the slot 42. An elastomeric stopper 46 of generally triangular cross-section is supported by a semicylindrical leaf spring 48 which extends from the area of the opening to the opposite side of the housing 22 so that the spring force acts across the housing. The configuration of the elastomeric stopper 46 closely complements the exterior shape of the opening 42 as defined by the lip 44 and under the bias of the spring 48 effects a relatively air-tight closure of the opening 42. The spring 48 includes a pair of axially extending tabs 50 near the mount for the stopper 46 to facilitate opening movement of the stopper 46 from the lip 44 in a manner to be described in more detail below.

As shown in FIGS. 3 and 4, the positive web element P coiled about the hollow core 40 is supported in the chamber 30 for radial movement in the direction of the slot opening 42 in a manner so that the outer periphery of the coiled web element P will remain in close proximity to or in contact with the housing interior in the region of the slot 42 with changes in diameter of the coiled web P. To this end, opposite ends of the housing 22 are shaped to guide the projecting ends of the core 40 toward the opening 42. Specifically, the end walls of the housing 22 are formed having spaced lower and upper ramp formations 52 and 54, respectively. The ramp formations are spaced by the approximate outside diameter of the core 40 so that the latter will be biased toward the slot 42. Leaf springs 56, cantilevered from slot formations 58 at the lower rear ends of the interior of the housing 22, bias the core and thus the periphery of the coiled web element P against the housing interior in the region of the slot 42. Additionally, the springs 56 provide a slight frictional drag opposing rotation of the coil and of the core 40 to assure that convolutions of the coiled web P will remain in intimate contact with each other. Alternately, the core 40 can be eliminated, and the web allowed to clockspring outwardly within the chamber 30.

Figure 5:
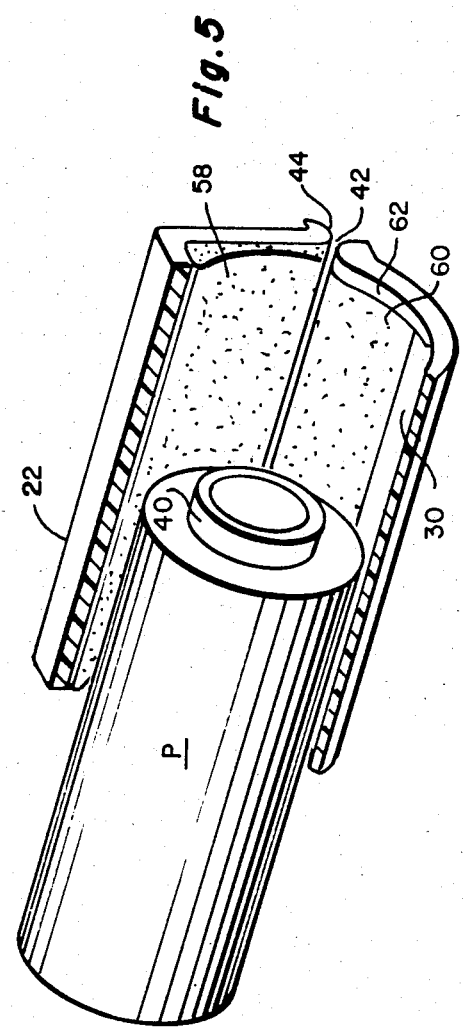
FIG. 5 is an exploded perspective view illustrating the interior of an enclosed chamber at one end of the cassette shown in FIG. 1.

The described construction of the housing 22 as including the stopper 46 and lip configuration about the slot opening 42 to effect a releasable or openable seal for the chamber 30 coupled with the augmenting of this seal by retaining the outer periphery of the coiled positive web P against the inner inside of the slot 42, will be effective to retain a liquid processing agent impregnated in or coated on the web P. As an additional measure of assuring that the liquid processing agent will be retained in operable condition on the web P while it is in the chamber 30, a sacrificial supply of water or other liquid reagent is provided within the chamber 30. While such a reagent may be supplied very simply by impregnating a sponge or other porous element located in the hollow spool core 40, it is preferred that the water or other liquid reagent be maintained in proximity to the opening slot 42. To this end, and as shown most clearly in FIGS. 4 and 5, the interior surfaces of the housing on opposite sides of the slot 42 secure a pair of absorbant strips 58 and 60 whose inner surfaces conform with the outer periphery of the coiled web P. As a result, the strips enhance the sealing effect about the slot 42 from the interior of the housing 22 by the outer periphery of the coiled web and contain the water or other liquid reagent where it is likely to be first evaporated. Also, any portion of the web P extending from the coil in the chamber will be assured of a vapor laden atmosphere to inhibit evaporation of the processing agent from that portion of the web P. The biasing of the web P against the inside of the slot whether by the coil bias illustrated or by clockspring, etc., minimizes the exposed length of the web P and also tends to maintain this length constant. Hence, the exposed area of the agent is minimized and maintained constant. Further in this respect, it will be noted that at the ends of the chamber 30 and for approximately the width of the strip 60, slightly elevated convolute tracks 62 are provided so that as the coiled web P is advanced toward the slot 42, the extent to which it can compress the strip 60 is limited.

Although water alone is, in many instances, an adequate liquid media to prevent loss of the processing agent from the web P, it may be desirable to maintain the high pH level of the processing agent on the web P by providing a "getter" for any carbon dioxide which may enter the chamber 30 through the slot as the latter is opened during operation in a manner to be described. U.S. Pat. No. 3,907,563 mentions, for example, that calcium hydroxide may be provided for reacting with carbon dioxide where potassium hydroxide is used in the liquid processing agent. Alternatively, potassium hydroxide, barium hydroxide and calcium hydroxide may be used in the chamber 30 as a getter for carbon dioxide when sodium hydroxide is incorporated in the processing liquid. Regardless of the liquid material retained in the chamber 30, the structural organization of the strips 58 and 60 will enhance the intended application of such materials.

Figure 6:
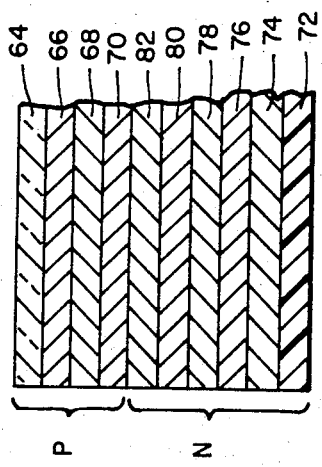
FIG. 6 is a fragmentary cross-section illustrating the film system used in the present invention.

While the film system used in accordance with the present invention is substantially the same as that disclosed in the above-mentioned U.S. Pat. No. 3,907,563, a review thereof would be helpful in gaining an understanding of the overall operation and method of the present invention. Thus, and as shown in FIG. 6, the positive web P includes a transparent substrate 64 on which an image receiving layer 66 is directly coated. A white pigmented layer 68 follows the image receiver layer 66 and finally an opaque layer 70 defines the surface of the web opposite from the support 64. The processing agent referred to above, as disclosed in the aforementioned U.S. Patent, may be either impregnated in the layers 66, 68 and 70 or incorporated as an additional layer on the opaque layer 70.

The negative web N is also provided with a support 72 which may be either opaque or transparent. If it is transparent, it is coated with an opaque layer 74 followed by a polymeric acid layer 76, a timing interlayer 78, a dye developer layer 80 and finally a silver halide layer 82. Where the support 72 is opaque, the layer 74 may be omitted. Also it will be noted that the acid layer 76 is provided to neutralize the alkaline processing agent carried by the positive web P after the two webs P and N have been brought together for processing. The timing interlayer 78 slows this neutralization process in order to assure full processing of the image forming layers. In the final product, the resulting positive image is viewed through the transparent support 64 of the positive web P.

The film elements P and N are supplied as coils within the chambers 30 and 32 with the support layers 64 and 72 on the respective coils facing outwardly. Thus, as the web element N is payed out from the coil in the chamber 32, through the opening 36 and along the floor of the cassette 10, the support 72 thereof will be in contact with the floor 14 whereas the silver halide layer 82 will be presented upwardly. The positive film element sealed in the chamber 30 will pay out from the coil on the spool core 30 about the curved bottom lip of the opening 42 with the support 64 thereof in contact with the surfaces of the lip 44 about the slot 42. From the slot 42, the positive element P passes into face-to-face contact with the active layers on the negative element N under pressure exerted by a pair of rollers 84 and 86.

Although the camera or other dark chamber apparatus with which the cassette 10 will be used in practice is not fully shown in the drawings, portions of such apparatus are illustrated in FIG. 4. In particular, fragments of a camera body are designated by the reference numeral 88, such a body having a hinged door 90 pivotally mounted from the body on an axis 92. The size of the door will therefor allow the cassette 10 to be inserted into the camera body 88. Image light passing an objective lens (not shown) is reflected and reversed by a reflex mirror (not shown) downwardly to the negative element N overlying the floor 14 of the cassette.

Because a cassette of the type represented by the cassette 10 is a single-use device or a device which is disposed of after the film originally supplied therein has been used, it is important that the number and expense of components mounted on the cassette be restricted to reduce costs. In this respect, it is noted that the pressure rollers 84 and 86 necessary for a film system of the type described do not require a high degree of precision and may be relatively simple elastomeric rollers. It is therefore possible and practical for both rollers 84 and 86 to be mounted on and made a permanent part of the cassette 10. On the other hand, initial handling of leaders by which the film elements P and N are initially positioned in the nip of the rollers 84 and 86 will be facilitated where one of the rollers is movable relative to the other. As illustrated, the roller 86 is journaled in the side walls 16 and 18 of the cassette 10 whereas the roller 84 is rotatably supported from the door 90 of the camera or other exposure apparatus in which the cassette 10 is used. For lowest cassette cost, both rollers are mounted in and remain a part of the camera or other exposure and/or processing apparatus. In addition, a guillotine-type cutter knife 94 and cutting anvil 96 are mounted on the door 90 and operated in a manner to be described.

In FIGS. 7–9 of the drawings, camera or exposure apparatus mounted parts cooperative with the cassette 10 are illustrated schematically to facilitate an understanding of how the rollers 84 and 86, the stopper 46 and the cutting knife 94 may be operated in practice. Thus in FIG. 7, a drive organization for the rollers 84 and 86 is illustrated as including an electric motor 100 having a drive gear 102 in mesh with a transfer gear 104 rotatable on a fixed axis 106. A drive gear 108 is carried by a beam 110 for rotation on an axis 112 near one end of the beam 110 and is in meshing engagement at all times with the transfer gear 104. The opposite end of the beam 110 carries an offset pawl 112 for engagement in sprocket-like apertures 113 provided along one marginal edge of the negative film element N. A programming disk 114, supported by the camera or other exposure apparatus for rotation about an axis 116, carries a cam projection 118 in a position to engage and lift the pawl end of the beam 110 from the position shown in FIG. 7, rocking the beam to a position where the drive gear 108 drops into engagment with a gear 120 coupled for rotation with the pressure roller 84. As a result of the organization shown in FIG. 7 and 7a, the negative film element may be held against transfer movement when the pawl 112 is engaged in one of the apertures 113. When the pawl 112 is lifted out of such engagement with the negative element N, the pinch rollers 84 and 86 will be driven to advance the film under power supplied by the motor 100.

In FIGS. 8 and 8b, a mechanism is illustrated for temporarily withdrawing the stopper 46 from the slot opening 42 of the housing 22 during advancing movement of the film elements P and N. In particular, a pair of plate brackets 122 (only one being shown) are pivotally supported from an axis 124 to lie on opposite sides of the housing when the cassette 10 is in place. The brackets 124 carry inwardly directed pins 126 which, when the cassette is in place, lie behind the laterally projecting tabs 50 on the spring 48. Thus, counterclockwise pivotal movement of the bracket 122 about the axis 24 will cause the stopper 46 to be moved away from the lip 44 of the slot 42. To effect this movement, a programming disk 128, rotatably supported on a fixed axis 130 in the camera or other exposure apparatus, carries a pair of camming projections 132 and 134. The camming projection 132 is engageable with an inwardly directed tang 136 on each bracket plate 122 so that clockwise rotation of the disk 28 will lift the tang 136 into engagement by and for support by a pivotal hook 138. The cam projection 134 is positioned to engage the bottom of the hook 138 and pivot it out of supporting engagement with the tang 136, so that the spring 48 will return the stopper 46 to its sealed position against the lip 44 of the slot 42.

In FIG. 9, a cutting knife actuator is shown as including a bracket plate 140 pivotably mounted from an axis 142 and having a depending arm portion 144 situated behind an abutment 146 on the cutting knife 94. The cutting knife 94 is biased against the arm portion 144 by a spring 148. A follower surface 150 on the bracket plate 142 is positioned to be engaged by a camming projection 152 on a disk 154 rotatably supported from the camera or other exposure apparatus on a fixed axis 156. Thus, counterclockwise rotation of the disk 154 will cause the camming projection 152 to engage the surface 150 on the bracket 140 and advance the knife 94 toward the anvil 96.

Figure 10:
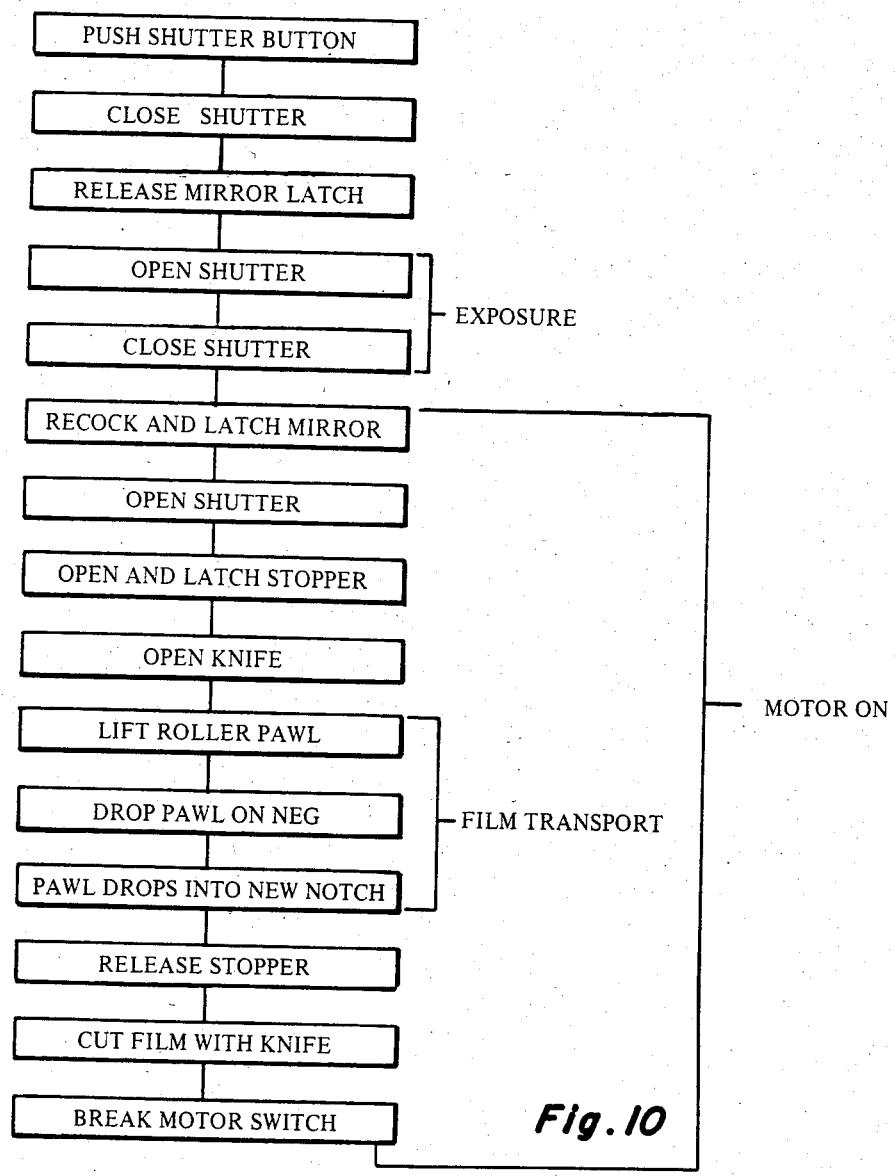
FIG. 10 is a flow chart illustrating a cycle of operation of the invention.

In practice, the programming disks 114, 128 and 154 are interconnected to each other and to the motor 100 by gear means (not shown) so that the respective operations resulting from rotation of the disks may be synchronized in a complete cycle of film exposure and processing. In FIG. 10 of the drawings, the successive steps of an exemplary operation cycle for a single-lens-reflex (SLR) camera is depicted by a flow chart. In an SLR camera, the mirror (not shown) is pivoted for movement between an exposure position and a viewing position in which it is normally latched against a biasing means (not shown) for moving the mirror to the exposure position. The described organization of the mirror is conventional to SLR cameras and, as such, well known to those skilled in the art. Also, it is to be noted that in the "rest" state of a camera designed for the operational cycle depicted by the flow chart in FIG. 10, and in accordance with the invention, the stopper 46 is closed, the knife 94 is held in a closed position by the camming projection 152 on the disk 154, the motor 100 is off and the camera shutter (not shown) is open.

A camera containing the cassette 10, therefore, may be operated by viewing the subject matter to be photographed and when appropriate framing and focusing has been accomplished in the usual manner, a shutter button (not shown) is depressed causing the shutter to be closed and the mirror (not shown) to be moved to the exposure position. The shutter is then opened and closed to expose a frame on the negative element N overlying the floor 14 of the central tray section 12 of the cassette 10. The motor 100 is then switched on to first re-position the camera mirror and shutter and then drive the disk 128 to move the stopper 46 away from the opening 42 of the cassette housing 22. The knife 94 is moved to its open position by rotation of the disk 154 as rotation of the disk 114 elevates the pawl end of the beam 112 out of engagement with the negative film element and until the gear 108 moves into engagement with the gear 120. The latter operation causes the rollers 84 and 86 to rotate, transporting both film elements through the nip of the two rollers. When the exposed area of the negative N has been advanced completely through the roller nip, together with an equal length of the positive film element P from the housing 22, the pawl 112 drops back into a notch 113 in the negative film element N and the hook 138 is released allowing the stopper 46 to move against and re-seal the opening 42. Finally, the knife 94 is actuated to sever the composite film laminate ejected from the camera and the motor is turned off.

A cycle of operation using a non-SLR or "viewfinder" camera is similar to that illustrated in FIG. 10 except that the mirror (not shown) would be permanently in the exposure position, and the normal or rest condition of the camera shutter would be closed. Thus, in such a camera, depressing the shutter button would initially open and close the shutter to effect the exposure mode and move directly to opening and latching the stopper 46. Apart from these differences, the cycle of operation involving the parts illustrated in FIGS. 7-9 would be the same.

In light of the foregoing, it will be noted that the positive film element P, which is initially coated or impregnated with liquid processing agent, is at all times sealed within the housing 22 and yet the housing may be opened to allow unobstructed transfer of the film element P from the housing 22 during operation of the processing rollers 84 and 86. Moreover, the retention of the knife 94 in its closed position at all times other than during passage of the film through the nip defined by the pressure rollers 84 and 86 acts in the manner of an auxiliary closure between any part of the film remaining in the camera and the camera exterior. As a result, all components of the positive film element P are isolated from the atmosphere in a manner to inhibit the evaporation of processing film from the element P. Effective operation of the system, therefore, is provided even when the camera in which the cassette 10 is loaded is left unused for relatively long periods of time between exposure cycles.

Thus it will be seen that as a result of the present invention, a highly effective method and apparatus is provided for handling film systems of the type described and by which the principle objective, among others, are completely fulfilled. It is contemplated and will be apparent to those skilled in the art from the previous description that modifications and/or changes may be made in the illustrated embodiment without departure from the invention. Accordingly, it is expressly intended the foregoing description and accompanying drawing illustrations are illustrative of a preferred embodiment only, not limiting, and that the true spirit and scope of the invention will be determined by reference to the appended claims.

What is claimed is:

1. Photographic apparatus for a film system having a pair of sheet elements, one of which includes a processing agent and the other of which includes a photographic negative, said apparatus comprising:
   a cassette having means for defining spaced first and second discrete storage chambers for the processing and negative elements of said film system, respectively, both said storage chambers having openings for the passage of the respective elements thereform;
   means situated between said storage chambers to present the negative element for exposure;
   means for withdrawing the film elements from said storage chambers and for bringing said processing and negative elements into face-to-face contact after exposure of the negative element;
   movable means for sealing the opening of the one of said storage chambers containing the processing element; and
   means for withdrawing said movable means from the opening of said one storage chamber during passage of the element carrying the processing agent from said one storage chamber.

2. The apparatus of claim 1 wherein said means for withdrawing the film elements and for bringing the elements into face-to-face contact comprises a pair of pressure rollers located adjacent to the opening of said one storage chamber.

3. The apparatus of claim 2 comprising means for alternately driving said pressure rollers to withdraw the film elements and holding at least one of said elements against movement.

4. The apparatus of claim 1 wherein said movable means for sealing the opening of said one storage chamber comprises a stopper and means for releasably retaining said stopper in sealing engagement with the opnening of said one chamber.

5. The apparatus of claim 4 wherein said releasable retaining means comprises a leaf spring fixedly mounted in relation to said one chamber, said leaf spring supporting said stopper.

6. The apparatus of claim 1 wherein the element of the film system carrying the processing agent is supplied in said one chamber as a coiled web with the processing agent provided on the inner surface and including means for biasing at least a portion of the outer periphery of said coiled web against the inner surfaces of said chamber about said opening to minimize and to maintain constant the exposed area of the processing agent thereat.

7. The apparatus of claim 6 wherein said means for biasing said portion of the outer periphery of said coiled web against the inner surfaces of said one chamber comprises ramp means for supporting said coiled web inclined toward said opening of said one chamber.

8. The apparatus of claim 7 wherein said means for biasing said portion of the outer periphery of said coiled web against the inner surfaces of said one chamber further includes spring means to bias said coiled web along said ramp means toward the opening of said one chamber.

9. The apparatus of claim 1 including means for retaining a sacrificial liquid in said one chamber.

10. The apparatus of claim 9 wherein said means for retaining a sacrificial liquid in said one chamber comprises a pair of absorbent strips supported in said one chamber on opposite sides of the opening of said one chamber.

11. In a photographic apparatus for a film system having a liquid processing agent supplied as a coating on, or an impregnation of, a web brought into face-to-face contact with an exposed film element to provide a photographic image, the improvement comprising:
    a web housing for providing an otherwise sealed chamber having a slot-like opening for passage of said web from said chamber; and
    releasable stopper means carried by said housing for movement between a sealing position closing said opening and an opened position permitting unobstructed passage of said web from said chamber, said stopper means including a stopper and a leaf spring mounted to the exterior of said housing, said leaf spring supporting said stopper and biasing same into said sealing position.

12. The apparatus of claim 11 wherein said opening extends longitudinally along a given portion of said chamber and said leaf spring extends from the area of said opening around said chamber to an opposite side thereof so that the spring force acts across said chamber.

13. In a photographic apparatus for a film system having a liquid processing agent supplied as a coating on, or an impregnation of, a web brought into face-to-face contact with an exposed film element to provide a photographic image, the improvement comprising:

a web housing for providing an otherwise sealed chamber having a slot-like opening for passage of said web from said chamber, said web being mounted within said chamber as a coil of successive convolutions with the liquid processing agent located on the inner side of each convolution, and with the outer periphery of at least a portion of said coil biased against the inner surfaces of said chamber about said slot-like opening to minimize and to maintain constant the exposed area of the processing agent thereat;

spring means for biasing said coil in the direction of said slot-like opening and for imposing a frictional drag against rotation of said coil; and releasable stopper means carried by said housing for movement between a sealing position closing said opening and an opened position permitting unobstructed passage of said web from said chamber.

14. The method of storing, exposing and processing photographic film having a pair of web elements, a liquid processing agent carried by one of said web elements, and a light sensitive negative carried by the other of said web elements, said method comprising the steps of:

storing said web elements within their own discrete chambers, each of said chambers having an opening therein for passage of a web therethrough, said one web element being stored as a coil within one of said chambers;

biasing said coil against the interior of the opening of said one chamber;

sealing the opening of said one chamber containing said web element;

opening said one chamber to allow unobstructed passage of said one web element from said one chamber during a film processing operation; and reclosing said one chamber after completion of said film processing operation.

* * * * *